US012579575B1

(12) United States Patent
Johnson

(10) Patent No.: US 12,579,575 B1
(45) Date of Patent: Mar. 17, 2026

(54) SYSTEM AND METHOD TO PROVIDE A CROSSING FACILITY ON AN ELECTRONIC EXCHANGE NETWORK

(71) Applicant: Cboe Exchange, Inc., Chicago, IL (US)

(72) Inventor: Brett Johnson, Wichita, KS (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 18/352,705

(22) Filed: Jul. 14, 2023

Related U.S. Application Data

(60) Provisional application No. 63/389,628, filed on Jul. 15, 2022.

(51) Int. Cl.
G06Q 40/04 (2012.01)
G06Q 40/06 (2012.01)

(52) U.S. Cl.
CPC ............. G06Q 40/04 (2013.01); G06Q 40/06 (2013.01)

(58) Field of Classification Search
None
See application file for complete search history.

(56) References Cited

U.S. PATENT DOCUMENTS

| | | | | |
|---|---|---|---|---|
| 6,751,597 B1 * | 6/2004 | Brodsky | ............... | G06Q 40/00 |
| | | | | 705/37 |
| 8,386,364 B2 * | 2/2013 | Sibley | .................... | G06Q 40/04 |
| | | | | 705/37 |
| 8,473,403 B2 * | 6/2013 | Smith | .................... | G06Q 40/04 |
| | | | | 705/37 |
| 10,861,094 B1 * | 12/2020 | Pierce | .................... | G06Q 40/04 |
| 2008/0010221 A1 * | 1/2008 | Co | ........................... | G06Q 40/06 |
| | | | | 705/36 R |
| 2008/0120250 A1 * | 5/2008 | Hiatt, Jr. | ................ | G06Q 40/04 |
| | | | | 709/202 |
| 2016/0055581 A1 * | 2/2016 | Katsuyama | ............ | G06Q 40/04 |
| | | | | 705/37 |
| 2017/0287073 A1 * | 10/2017 | Mele | ....................... | G06Q 40/04 |
| 2019/0043128 A1 * | 2/2019 | Mele | ....................... | G06Q 40/04 |
| 2019/0311433 A1 * | 10/2019 | Schmitt | .................. | G06Q 40/06 |
| 2020/0065900 A1 * | 2/2020 | Wiesner | ................. | G06Q 40/04 |

* cited by examiner

*Primary Examiner* — Paul S Schwarzenberg
(74) *Attorney, Agent, or Firm* — Fish & Richardson P.C.

(57) ABSTRACT

An exchange computer system includes: at least one communication interface; a crossing facility configured to perform operations of: retrieving portfolio data encoding asset positions, a current measurement of capital efficiency, and participant-configured transaction portfolio attributes for at least two participants, wherein the participant-configured transaction portfolio attributes comprise a goal of capital efficiency, a transaction cost limit, and portfolio limits for each of the at least two participants; and performing a crossing operation between the portfolios of two of the at least two participants so that the at least two participants can each set and forget the respective transaction portfolio attributes by: based on the portfolio data of the two participants, identifying a network of single-leg transactions; and in response to determining that executing the network of single-leg transactions would not violate the transaction cost limit and the portfolio limits of each participant, executing the network of single-leg transactions.

20 Claims, 5 Drawing Sheets

400

RETRIVE PORTFOLIO DATA OF AT LEAST TWO PARTICIPANTS
ON AN EXCHANGE NETWORK 401

BASED ON THE PORTFOLIO DATA, IDENTIFY A NETWORK OF
SINGLE-LEG TRANSACTONS BETWEEN TWO PARTICIPANTS
410

FORGO THE
TRANSACTIONS
450

Y

EXECUTION VIOLATIVE
OF LIMITS? 430

N

EXECUTE THE NETWORK OF SINGLE-LEG TRANSACTION
WITHOUT INTERACTING WITH THE PARTICIPANTS
440

500

SYSTEM AND METHOD TO PROVIDE A CROSSING FACILITY ON AN ELECTRONIC EXCHANGE NETWORK

CROSS-REFERENCE TO RELATED APPLICATION

This application claims the benefit of U.S. Provisional Patent Application No. 63/389,628 filed Jul. 15, 2022, which is incorporated herein by reference in its entirety.

TECHNICAL FIELD

This application relates to real-time data processing of voluminous transactional data on an electronic exchange network.

BACKGROUND

A modern electronic exchange network can handle high-volume of information and high-speed of information exchange to support real-time transactions of financial instruments such as derivatives, stocks, and bonds. The electronic exchange network may operate various protocols including, for example, the FIX (Financial Information exchange) protocol, or variants adapted for streaming data to facilitate high-speed electronic communication for electronic trading and other activities. In many cases, a high-speed exchange network can process millions of streaming messages per second during peak trading periods.

SUMMARY

Implementations relate to an exchange computer system configured to analyze financial asset position data for each of two or more market participants/users, and to determine a network of single-leg two-party transactions that can improve capital efficiency benefit for each of the two or more participants while maintaining cost and participant-configured portfolio attributes within specified limits. Significantly, the implementations can allow for set-and-forget portfolio management.

Market conditions can and do change rapidly, which can introduce risks with respect to orders for financial instruments that may no longer be advantageous to the market participants who submitted the orders. For example, in an electronic or hybrid exchange environment in which millions of transactions are executed each second and unforeseen events occur frequently, manually controlling one or more transaction requests in view of rapidly changing events would be impracticable. In this context, market participants can greatly benefit from enhanced control and flexibility over their portfolios. Implementations of the present disclosure can provide the desired control and flexibility for at least three reasons.

First, the implementations enable users/market participants to set one or more portfolio attributes to be maintained by the network of transactions determined by the system. Portfolio attributes refer to characteristics or features that provide insights into the composition, risk profile, and performance potential of a portfolio. Examples of portfolio attributes may include: asset class, sector/industry exposure, geographic allocation, market capitalization, and risk profile. According to implementations of the present disclosure, once the portfolio attributes have been set, transaction can be executed without the need for transmission of further instructions to the exchange (and without the associated costs of bandwidth and other computing resources), so long as comparison against the attributes reveals that executing the transactions would not violate limits specified by the user. In other words, the user can adaptively configure the limits for the user's portfolio and then leave the user's portfolio alone so that the exchange system can set off on an auto-pilot mode of operation in which user's transactions are executed to abide by the limits prescribed by the user but without additional monitoring/input from the user (which can become difficult in the event of heavy and disruptive network traffic).

Second, the same system and methods that enhance control and flexibility for market participants can also reduce the bandwidth and computing resources required by the exchange and networked computer systems. For example, the implementations can vastly reduce the number of orders that ultimately need to be processed. For example, the set-and-forget capability eliminates the need for the user to remotely monitor each transaction to determine whether the transaction should be executed. Thus, the user can use the set-and-forget portfolio attributes without having to monitor market conditions and transaction parameters, along with the computing costs that that would otherwise entail. Indeed, the disclosed methodology reduces consumption of computing resources while at the same time enabling users to precisely manage the risk associated with each transaction. For example, by using the set-and-forget capability, the number of messages that are transmitted over the network can be reduced. This is because users are not panicking and sending millions of messages (particularly when the market is very volatile) to adjust their trading positions in real-time. Consequently, system resources and bandwidth are constrained.

Third, the platform implements a crossing facility to achieve a function that is unique on an electronic exchange system. Significantly, the crossing facility has no human equivalent because the crossing facility represents a system-level functionality on the electronic exchange network to automatically identify and execute single-leg two-party transactions between two or more participants (including e.g., dealer-to-dealer, brokerage-to-brokerage). By way of background, transactions on an electronic exchange network can involve two parties. A transaction can include multiple parts or legs. The different legs can involve, for example, currency conversions or certain obligations of the parties. A single-leg transaction can refer to a transaction that involves one set of obligations or currency conversions. By using trades limited to single-leg two-party transactions, the trades can be executed with reduced system complexities and corresponding burdens. While software agents may be installed to automatically execute condition-driven electronic transactions on behalf of a participant, such software agents cannot achieve a system-level function on the electronic exchange network. Additionally, the system-level functionality operates in the background to execute transactions autonomously between two or more participants (e.g., dealers and brokerage firms that consolidate transaction requests from all subscribers) without involving human management. As such, the system-level functionality is absent of human activities, just like a predefined batch job on a computer system (e.g., a cron job on a UNIX/Linux system). Nor does the system-level functionality need to know the identity of a participant (e.g. a subscribing user at a dealer). Instead, the system-level functionality automatically identifies a network of single-leg transactions between two participants and automatically executes the network of single-leg transactions to promote efficiency (without additional instructions and interactions), fairness (equal treatment to both participants and all subscribing users), and transparency (without the need to identify individual users). In other words, the system-level function improves the function on the electronic exchange platform by setting up a mode of operation where the system pursues a course of action consistent with predefined parameters, much like autopiloting on an airplane to fly the airplane consistent with pre-defined route/altitude parameters.

In one aspect, implementations provide an exchange computer system comprising: at least one communication interface configured to bridge communication between computing devices of at least two participants; a crossing facility comprising at least one hardware processor coupled to at least one non-transitory computer-readable medium, wherein the at least one non-transitory computer-readable medium stores (i) portfolio data of the at least two participants, and (ii) computer-executable instructions that, when executed by the at least one hardware processor, cause the crossing facility to perform operations comprising: retrieving the portfolio data encoding asset positions, a current measurement of capital efficiency, and participant-configured transaction portfolio attributes for each of the at least two participants, wherein the participant-configured transaction portfolio attributes comprise a goal of capital efficiency, a transaction cost limit, and portfolio limits for each of the two or more participants; and performing a crossing operation between the portfolios of two of the at least two participants so that the at least two participants can each set and forget the respective transaction portfolio attributes, wherein the crossing operation comprises: based on the portfolio data of the two participants, identifying a network of single-leg transactions between the two participants that, if executed, improve the respective capital efficiency of each participant; determining whether executing the network of single-leg transactions would violate the transaction cost limit or the portfolio limits of each participant; and in response to determining that executing the network of single-leg transactions would not violate the transaction cost limit and the portfolio limits of each participant, executing the network of single-leg transactions in the absence of interactions with each of the two participants.

The implementations may include one or more of the following features.

A capital efficiency of a participant may include at least one of: a return on portfolio (ROP), a risk-adjusted return metric, an allocation efficiency metric, a turnover ratio, and an risk metric. The portfolio limits of the participant may include at least one of: a limit of risk, an asset class limit, a sector/industry limit, a risk limit, a geographic limit, a liquidity limit, a leverage limit, and a compliance limit. The portfolio limits of the participant may include a daily limit, or a monthly limit. The single-leg transaction may involve one set of exchange between the two participants. The crossing facility may be further configured to perform operations of: in response to determining that executing the network of single-leg transactions would violate the transaction cost limit and the portfolio limits of each participant, forgoing the network of single-leg transactions. Executing the network of single-leg transactions may cause the network of single-leg transactions to be processed in in one act, thereby reducing network traffic that otherwise would be required for processing orders placed by each of the two participants. Performing the crossing operation may be conducted without remote monitoring of each transaction by the two participants. The crossing facility may be further configured to perform operations of: in response to an update of the portfolio data of a participant, performing another crossing operation between the participant and at least one other participant. The crossing facility may be further configured to perform operations of: determining an updated capital efficiency for each of the two participants, wherein the updated capital efficiency of each participant is improved over the respective current capital efficiency; and updating the portfolio data for each of the two participants so that the current capital efficiency is updated accordingly. The crossing facility may be further configured to perform operations of: comparing the updated capital efficiency for a participant with the respective goal of capital efficiency of the participant; and in response to determining that the updated capital efficiency for the participant has not reached the respective goal of capital efficiency, performing another crossing operation between the participant and one other participant.

In another aspect, implementations provide a computer-implemented method that includes: retrieving the portfolio data encoding asset positions, a current measurement of capital efficiency, and participant-configured transaction portfolio attributes for each of the at least two participants, wherein the participant-configured transaction portfolio attributes comprise a goal of capital efficiency, a transaction cost limit, and portfolio limits for each of the two or more participants; and performing a crossing operation between the portfolios of two of the at least two participants so that the at least two participants can each set and forget the respective transaction portfolio attributes, wherein the crossing operation comprises: based on the portfolio data of the two participants, identifying a network of single-leg transactions between the two participants that, if executed, improve the respective capital efficiency of each participant; determining whether executing the network of single-leg transactions would violate the transaction cost limit or the portfolio limits of each participant; and in response to determining that executing the network of single-leg transactions would not violate the transaction cost limit and the portfolio limits of each participant, executing the network of single-leg transactions the absence of interactions with each of the two participants.

The implementations may include one or more of the following features.

A capital efficiency of a participant may include at least one of: a return on portfolio (ROP), a risk-adjusted return metric, an allocation efficiency metric, a turnover ratio, and an risk metric. The portfolio limits of the participant may include at least one of: a limit of risk, an asset class limit, a sector/industry limit, a risk limit, a geographic limit, a liquidity limit, a leverage limit, and a compliance limit. The portfolio limits of the participant may include a daily limit, or a monthly limit. The single-leg transaction may involve one set of exchange between the two participants. The method may further include: in response to determining that executing the network of single-leg transactions would violate the transaction cost limit and the portfolio limits of each participant, forgoing the network of single-leg transactions. Executing the network of single-leg transactions may cause the network of single-leg transactions to be processed in in one act, thereby reducing network traffic that otherwise would be required for processing orders placed by each of the two participants. Performing the crossing operation may be conducted without remote monitoring of each transaction by the two participants. The method may further include: in response to an update of the portfolio data of a participant, performing another crossing operation between the participant and at least one other participant. The method may further include: determining an updated capital efficiency for each of the two participants, wherein the updated capital efficiency of each participant is improved over the respective current capital efficiency; and updating the portfolio data for each of the two participants so that the current capital efficiency is updated accordingly. The method may further include: comparing the updated capital efficiency for a participant with the respective goal of capital efficiency of the participant; and in response to determining that the updated capital efficiency for the participant has not reached the respective goal of capital efficiency, performing another crossing operation between the participant and one other participant.

The details of one or more embodiments of the subject matter described in this specification are set forth in the accompanying drawings and the description below. Other potential aspects, features, and advantages will be apparent from the description, the drawings, and the claims.

DETAILED DESCRIPTION

Figure 1:
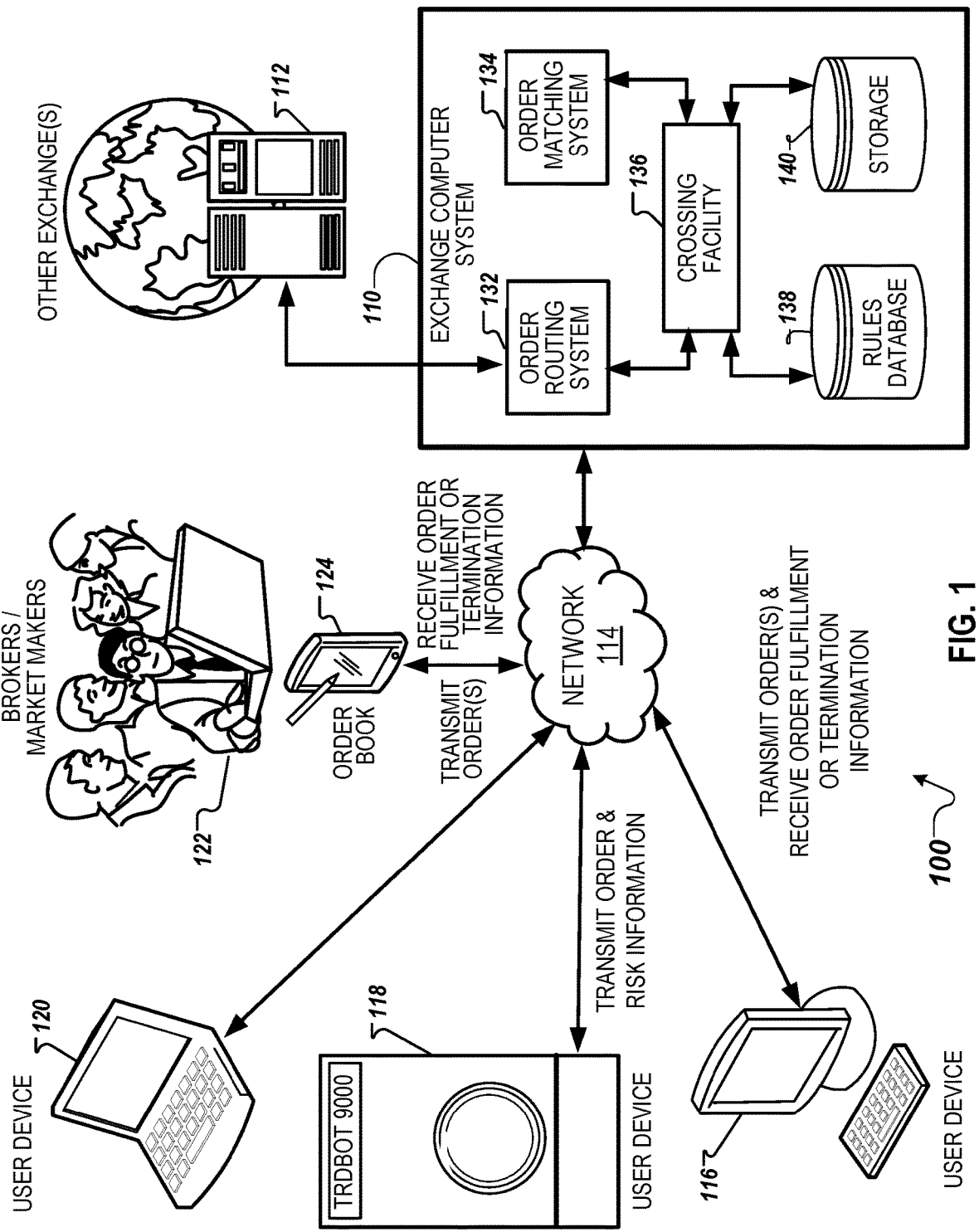
FIG. 1 is an example diagram of an exchange computer system and associated networks, devices, and users.

FIG. 1 is a diagram of an exemplary trading environment 100 for providing a crossing facility on an exchange network between two participants for automatic set-and-forget portfolio management. Generally, the terms "participant" and "user" are used interchangeably to refer to any entity that interacts with the exchange computer system and/or associated networks and devices. Participants or users may include, for example, market makers and other market professionals, brokers, institutional traders, individual traders, and automated trading systems. The term "portfolio attributes" may refer to characteristics or features that describe a portfolio of investments. Such attributes can provide insights into the composition, risk profile, and performance potential of a portfolio. Examples of portfolio attributes can include: asset class (e.g., stocks, bonds, commodities, real estate, or cash equivalents), sector or industry exposure (e.g., exposure to technology, healthcare, financial services, consumer goods, or energy sectors, which description can reflect the diversification or concentration within specific segments of the economy), geographic allocation (e.g., the geographic regions or countries in which the portfolio holds investments), market capitalization (e.g., the size or value of the companies in which the portfolio invests), risk profile (e.g., the level of risk associated with a portfolio in view of factors such as the volatility of investments, historical performance, and the overall balance between risk and return), diversification (e.g., the extent to which a portfolio is spread across different investments and asset classes), liquidity attribute (e.g., the ease with which investments in the portfolio can be bought or sold without causing significant price impact).

The diagram 100 may include an exchange computer system 110, other exchanges 112, a network 114, user devices 116, 118, 120, market makers/brokers 122, and electronic order book 124. The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as treasury notes or bonds, stocks, options, futures contracts, or other derivatives associated with an underlying asset.

Network 114 connects the various components within the trading environment to facilitate communications between those components. For example, network 114 can be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX) implemented over TCP/IP.

For example, various implementations may leverage a messaging protocol such as the FIX (Financial Information exchange) protocol, which an electronic messaging protocol used by financial institutions to facilitate electronic communication for trading and other activities in the financial markets. The protocol defines a set of rules and guidelines for exchanging real-time market data, trading instructions, and other financial information between different parties. FIX messages may be sent in a specific format, which includes a message header, body, and trailer. The header contains information about the sender and receiver, while the body contains the actual message data. The trailer includes a checksum to ensure the message's integrity. The typical range of volume of FIX messages on a high-speed exchange network can vary widely depending on a number of factors, such as the type of trading activity, the number of participants, and the level of market volatility. However, in many cases, a high-speed exchange network can operate to process millions of FIX messages per second during peak trading periods. Indeed, operating FIX protocol on high-speed exchange networks can achieve low latencies in the range of microseconds or nanoseconds to allow market participants to execute trades quickly and efficiently in rapidly changing market conditions. As trading activity and market complexity continue to grow, exchange networks and market participants are continually working to optimize FIX messaging systems and protocols to support even higher volumes of data and faster processing speeds.

While the FIX protocol uses a text-based tag-value format, the implementations can also operate binary format messages with fixed-length fields tailored to the specific needs of communication and market data dissemination. For example, information technology exchange (ITCH) protocols use binary format messages with fixed-length fields to further reduce communication latency and increase communication throughout.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a crossing facility 136, a database of trading rules and algorithms 138, and storage 140. In some implementations, the exchange computer system 110 is a distributed computer system.

The order routing system (ORS) 132 determines whether a received order or quote is to be executed at the exchange computer system 110, or should instead be redirected to another exchange 112, and may include processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange. If the ORS 132 determines that the exchange computer system 110 is the destination of the received order or quote, the ORS 132 may forward the received order or quote to the order matching system 134.

The order matching system (OMS) 134 may include processing systems that analyze and manipulate orders according to matching rules stored in the database 138. The OMS 134 may also include an electronic book (EBOOK) of orders and quotes with which incoming orders to buy or sell are matched, according to the matching rules. The EBOOK may also be implemented in a separate database such as storage 140, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The crossing facility 136 may be implemented using a combination of software and hardware. The crossing facility 136 may, for example, be implemented as one or more hardware processors configured to execute one or more algorithms, as described in further detail below. An example configuration of an exchange computer system featuring a crossing facility 136 is further described in FIG. 2. The crossing facility 136 may provide a system-level crossing functionality between two participants so that each participant can set the respective portfolio attributes and then exchange computer system 110 can automatically attend to portfolio management accordingly without further input from the participants, as further described, for example, with respect to FIGS. 3, 4, and 5.

For example, as a component of exchange computer system 110, crossing facility 136 may retrieve portfolio data from two or more participants on the exchange network. The portfolio data can be retrieved through messaging using the FIX protocol, or through streaming protocols such as the ITCH (information technology exchange) protocol. Examples of portfolio data can include asset positions, a current measurement of capital efficiency, and participant-configured transaction portfolio attributes for each of the two or more participants. The participant-configured transaction portfolio attributes can include a goal of capital efficiency, a transaction cost limit, and portfolio limits for each of the two or more participants. A capital efficiency of a participant can include at least one of: a return on portfolio (ROP), a risk-adjusted return metric, an allocation efficiency metric, a turnover ratio, and an risk metric. The portfolio limits of the participant can include at least one of: a limit of risk, an asset class limit, a sector/industry limit, a risk limit, a geographic limit, a liquidity limit, a leverage limit, and a compliance limit. The portfolio limits of the participant may correspond to a daily limit, or a monthly limit. Metrics of capital efficiency can include, for example, trading volume and liquidity, market impact and slippage, bid-ask spread, order execution speed, market efficiency, trading costs, exchange technology and infrastructure, and regulatory compliance. Trading volume indicates the level of activity and liquidity in the exchange market. Higher trading volume and liquidity generally suggest better capital efficiency by implying ease of buying and selling securities without significant price impact. Market impact and slippage measures the difference between the expected price of a trade and the actual executed price. Lower market impact and slippage indicate better capital efficiency by suggesting that trades can be executed at desired prices with minimal impact on the market. The bid-ask spread represents the difference between the highest price that a buyer is willing to pay (bid) and the lowest price that a seller is willing to accept (ask). A narrower bid-ask spread is generally associated with better capital efficiency, as it reduces transaction costs and improves liquidity. The order execution speed can refer to the speed at which orders are executed is an important factor in capital efficiency. Faster order execution ensures that trades are completed promptly, reducing the time during which capital is tied up in the market. Various market efficiency measures, such as the efficient market hypothesis (EMH) or price discovery metrics, can indirectly reflect capital efficiency. These measures assess how quickly and accurately information is incorporated into security prices, which affects the efficiency of capital allocation in the market. Trading costs can include commissions, fees, and slippage, helps determine the efficiency of capital utilization. Lower trading costs indicate better capital efficiency as it reduces the impact of expenses on overall investment performance. The efficiency of the exchange's technology and infrastructure can impact capital efficiency. Faster and more reliable trading platforms, advanced order matching algorithms, and low-latency connectivity contribute to efficient trade execution and better capital utilization. Compliance with regulatory requirements, such as market integrity rules, risk management frameworks, and transparency standards, contributes to capital efficiency by ensuring fair and orderly markets and protecting investors' interests. These metrics can provide insights into liquidity, transaction costs, order execution speed, market transparency, and other factors that impact the effectiveness and productivity of capital utilization within the financial industry The crossing facility can analyze the position data from user devices 116, 118, and 120, and identify a network of single-leg transactions between two of the participants. A single-leg transaction generally involves only one set of exchange between the two participants. As further explained in association with FIG. 4, the implementations can automatically identify the network of single-leg transactions between two of the participants so that the capital efficiency of each participant can be improved or potentially maximized without violating the transaction cost limit or the portfolio limits of each participant. By virtue of this configuration, each participant can set-and-forget the respective portfolio so that after setting the parameters of the respective portfolio, crossing facility 136 can automatically perform portfolio management in accordance with the set parameters without interactions with the participants, or further instructions from the participants.

The electronic order book 124 may be a trade at settlement order book and the determined transaction price of the order from the received data is based on a daily settlement price. In some implementations, the electronic order book 124 may be a mark-to-model order book and the determined transaction price of the order from the received data is based on a daily settlement price determined by one or more financial models. For example, the daily settlement price may be provided by a financial model when a market for the underlying asset is not available, e.g., for complex financial instruments. In some implementations, the daily settlement price may be determined from a non-total return forward curve with a known expected dividend return.

The order from the received data may be a market order. In some implementations, other types of derivative contracts (e.g., forwards, swaps, and options) may be traded. In some implementations, a user may receive settlement by transferring the underlying asset to the user. In other implementations, the user may receive a cash-value settlement.

In some implementations, the exchange computer system 110 is a distributed computer system that includes an order entry port (e.g., by network 114), an order routing system (e.g., ORS 132), an order matching system (e.g., OMS 134), and a crossing facility (e.g., crossing facility 136). The distributed computer system may operate multiple hardware and software processes in parallel configurations. The order entry port receives the order from the data sent to the exchange computer system by a user device and the order routing system is configured to route the order to a destination associated with the order. As an example, the destination may include other exchanges 112, based on matching rules stored on database 138 and the configuration of the order matching system to match the order to the destination in the other exchanges 112.

Storage 140 and database 138 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the crossing facility 136. The crossing facility 136 matches the buy side and sell side of a trade, and forwards the matched trade to a third-party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

Figure 2:
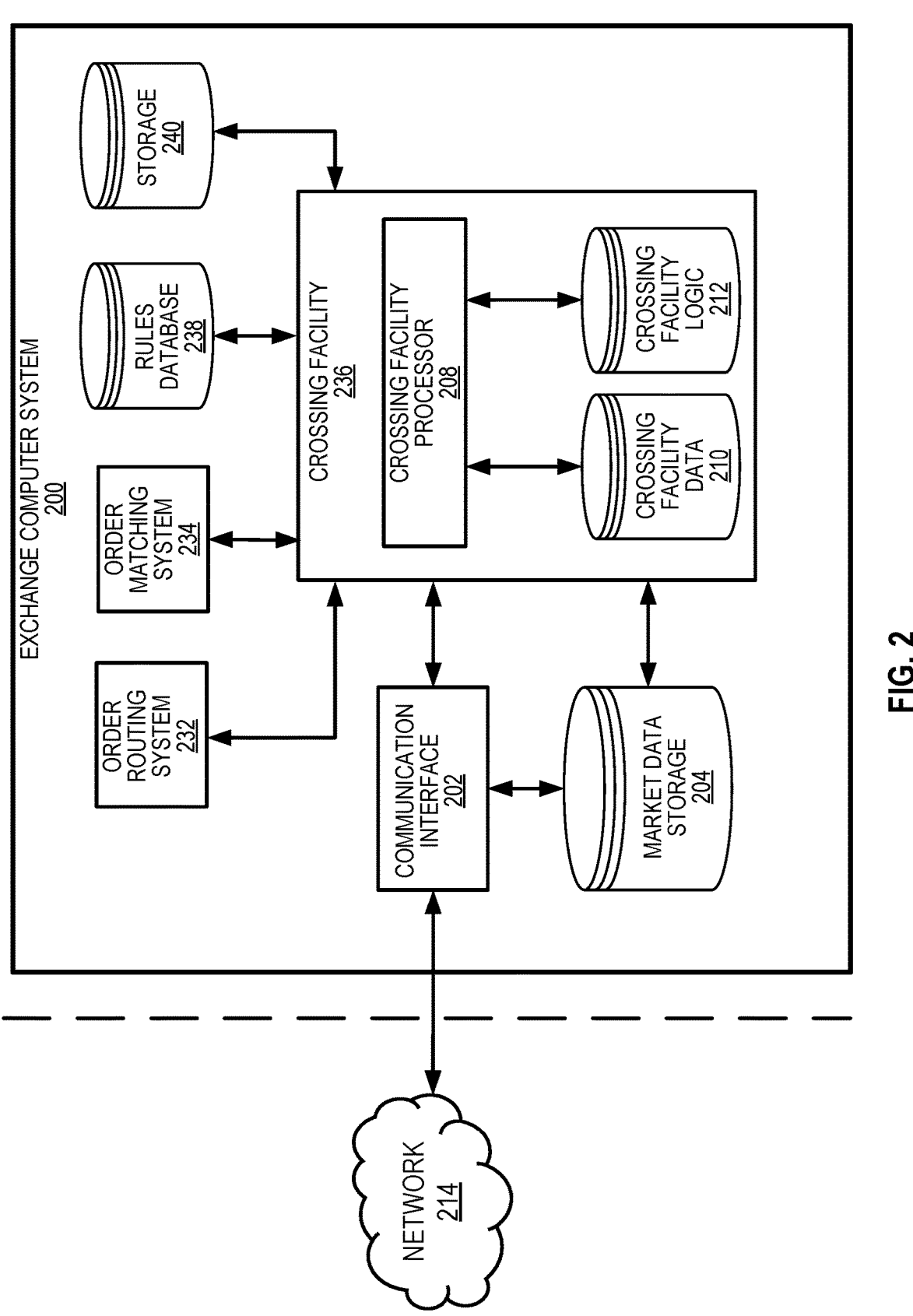
FIG. 2 is an example diagram of an exchange computer system including a crossing facility.

FIG. 2 is a diagram of an example exchange computer system 200 with a crossing facility 236 configured to generate, trade, and settle liquidities. The exchange computer system 200 may be implemented by software, hardware, or some combination as described herein. As an example, the exchange computer system 200 may be implemented as a server, a computer, or other device or processing component using proprietary software designed and implemented to achieve the functionality described herein. The exchange computer system 200 may be distributed or subdivided between a plurality of entities e.g., multiple computing devices.

The exchange computer system 200 may include a communication interface 202, coupled with a market data storage 204. The communication interface 202 may be communicatively linked to the crossing facility 236, which includes a crossing facility processor 208, crossing facility data 210, and crossing facility logic 212. The crossing facility 236 may also be communicatively linked to an ordering matching system 234, an order routing system 232, a rules database 238, and storage 240 of the exchange computer system 200. The communication links in the exchange computer system 200 may be established by a system bus, network, or one or more other connection mechanisms. As an example, the connection mechanisms may include a wired connection, a wireless connection, or a combination thereof. For example, the connection may be a physical connection, such as a wired Ethernet connection. In another example, the connection may be a wireless connection, such as a cellular telephone network, an 802.11, 802.16, 802.20 controls or components, a WiMax network, or any other type of network (including 5G network and variations of the 5G network). Further, network 214 may be a public network, such as the Internet, a private network, such as an intranet, or combinations thereof, and may utilize a variety of networking protocols now available or later developed including, but not limited to TCP/IP based networking protocols.

The crossing facility processor 208 may include one or more processors, such as general-purpose processors (e.g., a microprocessor), special-purpose processors (e.g., an application-specific integrated circuit (ASIC) or digital-signal processor (DSP), programmable-logic devices (e.g., a field programmable gate array (FPGA)), or any other processor components now known or later developed. The crossing facility processor 208 may carry out one or more instructions using one or more arithmetic, logical, and/or input/output operations. Though crossing facility processor 208 is illustrated as a single component, crossing facility processor 208 may be integrated in whole or in part with other components of the exchange computer system 200.

Data storage e.g., market data storage 204 and crossing facility data 210, may be a main memory, a static memory, or a dynamic memory. Market data storage 204 and storage for crossing facility data 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. As an example, market data storage 204 and storage for crossing facility data 210 may include a cache or random access memory for the crossing facility processor 208. Market data storage 204 and storage for crossing facility data 210 may be separate from the crossing facility processor 208, such as a cache memory of a processor, the system memory, or other memory. Market data storage 204 and storage for crossing facility data 210 may be an external storage device or database for storing data. Examples may include a hard drive, compact disc ("CD"), digital video disc ("DVD"), memory card, memory stick, universal serial bus ("USB") memory device, or any other device operative to store data.

As further shown, the crossing facility 236 may include crossing facility data 210 and/or crossing facility logic 212. The crossing facility data 210 may include one or more types of data suitable for a given implementation. For example, crossing facility data 210 may include data (such as input datasets) that may be stored in memory. Crossing facility logic 212 may include, for example, machine language instructions executable by crossing facility 236 to carry out various functions, such as the functionality of the methods and systems described herein. In some implementations, the functions, acts or tasks may be independent of the particular type of instructions sets, storage media, processor or processing strategy and may be performed by software, hardware, integrated circuits, firm-ware, micro-code and the like, operating alone or in combination. Processing strategies may include multiprocessing, multitasking, parallel processing and the like.

In the exchange computer system 200, the communication interface 202 may include one or more structures, and associated equipment, for receiving data from one or more sources and distributing data to a group of one or more destinations. In some implementations, the communication interface 202 may include one or more additional communication interfaces and can operate in different configurations (e.g., distributed system, parallel). The communication interface 202 may be configured to receive input datasets from one or more entities (e.g., user devices or other exchanges) and store all or part of the input datasets in market data storage 204. The communication interface 202 may also be configured to communicate all or part of the input datasets to the crossing facility 236 once the input datasets are stored or otherwise processed. The communication interface 202 may include a transceiver having one or more input/output ports connected to the network 214 to securely transmit data from the crossing facility 236 to user computing devices.

As an example, the input datasets are stored in market data storage 204 may be partitioned (e.g., horizontal, vertical, functional) into designated memory locations (e.g., virtual addresses) based on qualities of the input datasets, and a type of underlying asset. In some implementations, input datasets with data related to component stock options may be stored in market data storage 204 and include a linking identifier (e.g., address, memory mapping) to identify a corresponding stock for each of the component stock options. In some implementations, the market data storage 204 may be configured to receive an indicator describing the operating status (e.g., receiving, clearing, storing) of input datasets of the communication interface 202.

The input datasets from the communication interface 202 may include financial market data (e.g., market intelligence) corresponding to the underlying asset. For example, financial market data may include volatilities, interest rates, dividends, returns (e.g., historical, expected), market capitalization, sector, prices (e.g., bid and ask), liquidity, and other metrics related to the underlying asset. Financial market data may also include measures, estimates, and other related data for options (e.g., calls, puts), futures, and other derivatives. The input datasets may also include corresponding log files to describe and store the financial market data. The log files may include metadata to tag or characterize data, e.g., corresponding time periods for which the data was recorded. For example, the log files may include a tag for sorting or filtering the data of the log files.

Upon receiving input datasets from the communication interface 202, including data stored in the market data storage 204, the crossing facility 236 may perform further processes including analyzing portfolio data of two participants and identify a network of single-leg transactions between the two participants. The crossing facility 236 may determine whether executing the network of single-leg transactions would violate the transaction cost limit or the portfolio limits of each participant. The crossing facility 236 may perform operations using the crossing facility processor 208, with instructions stored in the crossing facility logic 212, and data stored in crossing facility data 210. The data stored in crossing facility data 210 may include all of or a subset of the data stored in market data storage 204, where the subset of the data stored in the crossing facility data 210 can be filtered based on a specified time period. The crossing facility 236 may perform operations on the crossing facility data 210 including deleting, archiving, tagging, and resetting. The crossing facility 236 can utilize metadata, including log files, to process (e.g., filtering, sorting, matching) the crossing facility data 210.

The crossing facility 236 may also access other components of the exchange computer system 200 including the order matching system 234, order routing system 232, rules database 238, and storage 240. The order matching system 234 may be configured to match an order received from the user device (e.g. user devices 116, 118, and 120) to another order based on the matching rules stored in the rules database 238. The order routing system 232 may be configured to route the order received from the user device to a destination associated with the order. The storage 240 may include additional data from the exchange computer system 200, accessed by the crossing facility 236 for processing. As discussed above, the crossing facility 236 may determine whether executing the network of single-leg transactions would violate the transaction cost limit or the portfolio limits of each participant. If not, the crossing facility 236 may access other components of the exchange computer system 200 including the order matching system 234, order routing system 232, rules database 238, and storage 240 so that the network of single-leg transactions can be executed with no additional input/instruction from either of the two participants. In other words, the crossing facility 236 can automatically maximize capital efficiency benefit for each of the two participants while maintaining cost and participant-configured portfolio attributes within specified limits.

As noted above, the exchange computer system 110 can securely transmit information based on data received over successive periods of time to connected user computing devices (e.g., user devices 116, 118, 120) that are themselves configured to display the information. The information may be displayed, for example, within a graphical user interface of an application that facilitates continuous real-time visualization, trading, and settlement through the exchange computer system.

Figure 3:
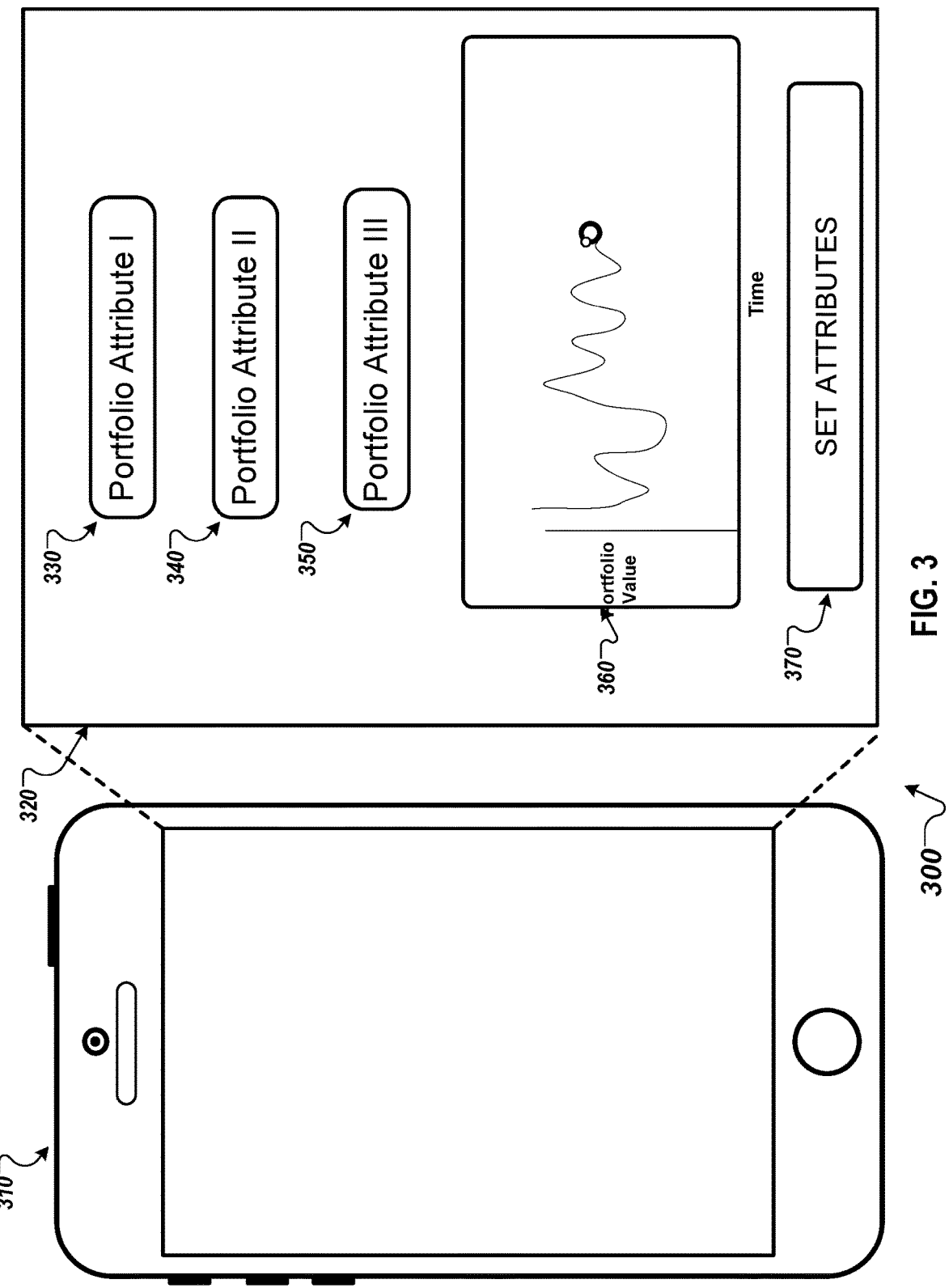
FIG. 3 is an illustration of an exemplary graphical user interface according to some implementations of the present disclosure.

FIG. 3 is an illustration of an exemplary graphical user interface on a device 310 for obtaining providing guidance to a user device regarding current market conditions on the electronic exchange network. A client device (e.g., user devices 116, 118, and 120) can, for example, display the graphical user interface for the user to monitor quotes from the liquidity pools that change minute by minute. For example, the top-of the-book prices of each liquidity pool may be streamed so that the ticker price are listed. A user of a device 310 can interact with a user interface panel 320 created on the device 310 after receiving data (e.g., crossing facility data 210) from the exchange computer system by a computer network (e.g., network 214). The user interface panel 320 can include fields that enable a user to select, portfolio attribute I (330), portfolio attribute II (340), and portfolio attribute III (350). The attributes can characterize the composition, risk profile, and performance potential of a portfolio. Examples of portfolio attributes can include: asset class, sector or industry exposure, geographic allocation, market capitalization, risk profile, diversification, and liquidity attribute, as outlined earlier. The user may additionally select other parameters, for example, expiry date of the set-and-forget portfolio. As noted above, implementations provide a set-and-forget capability in which participants can prescribe limits of portfolio attributes as well as transaction cost limits and the exchange network can automatically attend to portfolio management within the limits prescribed by each participant. The implementations may allow the user (e.g., the participants) to set an expiry date (e.g., a time stamp) when the set-and-forget capability is set to expire. The implementations may also allow the user (e.g., the liquidity consumer) to cancel the set-and-forget feature. A rolling curve of the portfolio value can be displayed in area 360, as the information is streamed to the user-computing device. The rolling curve can be presented as the position data is updated, or time elapses, so that the curve is extending in time horizon. Panel 370 may allow a participant to set the selected portfolio attributes.

Figure 4:
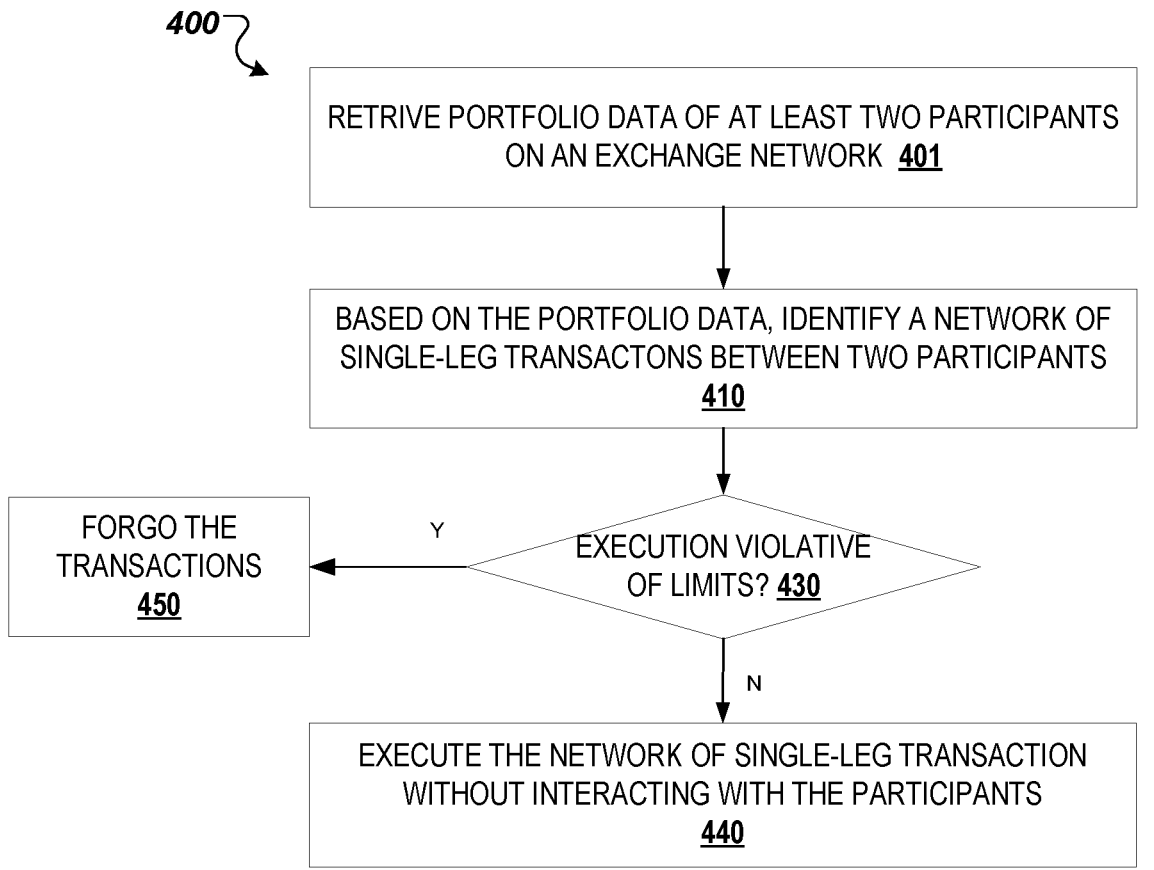
FIG. 4 is a flowchart of an example process according to some implementations of the present disclosure.

Further referring to flow chart 400 of FIG. 4, an example of a process can retrieve portfolio data from two or more participants on an exchange network (401). The portfolio data can encode asset positions, a current measurement of capital efficiency, and participant-configured transaction portfolio attributes for each of the two or more participants. The participant-configured transaction portfolio attributes can include a goal of capital efficiency, a transaction cost limit, and portfolio limits for each of the two or more participants. Portfolio attributes limits can refer to a participant-configured limit on asset class, sector or industry exposure, geographic allocation, market capitalization, risk profile, diversification, or liquidity. The limits can correspond to limits with a duration, for example, a daily limit, and a monthly limit.

The process may proceed with a crossing operation. For example, the process may, based on the portfolio data of two participants, identify a network of single-leg transactions between the two participants that, if executed, can reduce position size for each of the two participants (410). A single-leg transaction would involve just one set of obligations or currency conversion. By using transaction limited to single-leg two-party transactions, the implementations can reduce transaction costs and complexities (as compared to transactions involving multiple legs).

The process may then determine whether executing the network of single-leg transactions may violate the transaction cost limit or the portfolio limits of each participant (430). As discussed above, each participant may set a transaction cost limit and portfolio attributes limits. The limits can include an upper limit that may not be exceeded. The limits can also include a floor level limit that may not be lowered. These limits may not be violated during the set-and-forget operation.

In response to determining that executing the network of single-leg transactions would not violate the transaction cost limit and the portfolio limits of each participant, the process may execute the network of single-leg transactions without interacting with either of the two participants (440). The network of single-leg transactions to be processed in in one act, thereby reducing network traffic that otherwise would be required for processing orders placed by each of the two participants. The crossing operation can be is performed without remote monitoring of each transaction by the two participants, thereby achieving the feature of set-and-forget. In response to an update of the portfolio data of a participant, the process may perform another crossing operation between the participant and at least one other participant. The process may determine an updated capital efficiency for each of the two participants. The updated capital efficiency of each participant may be improved over the respective current capital efficiency. The process may then update the portfolio data for each of the two participants so that the current capital efficiency is updated accordingly. In some cases, the process may compare the updated capital efficiency for a participant with the respective goal of capital efficiency of the participant. In response to determining that the updated capital efficiency for the participant has not reached the respective goal of capital efficiency, the process may perform another crossing operation between the participant and one other participant.

In response to determining that the execution may violate a limit, such as a transaction cost limit, or a portfolio limit of a portfolio attribute, the process may forgo executing the network of transactions (450).

Figure 5:
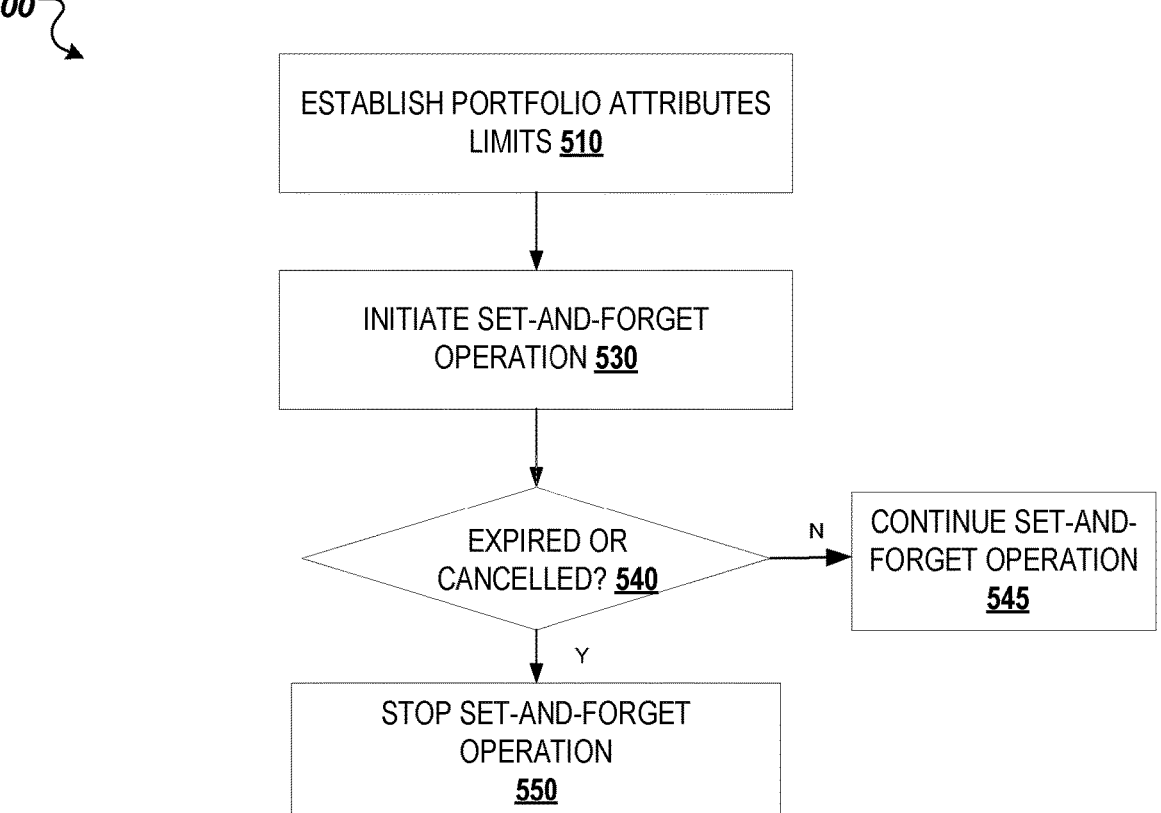
FIG. 5 is another flowchart of an example process according to some implementations of the present disclosure.

FIG. 5 shows another flow chart 500 according to some implementations of the present disclosure. The process may establish portfolio attributes limits by setting up a data structure to encode transaction cost limit and the portfolio limits for each participant (510). For example, a participant can establish the limit for a number of portfolio attributes, as illustrated in FIG. 3. For example, the participant can set a limit on daily transaction cost, a limit on exposure to a certain sector, a limit on liquid cash reserve, etc. After receiving data encoding the user-configured portfolio limits and transaction cost limit, the process may then initiate a set-and-forget operation so that the exchange computer system can automatically attend to portfolio management (530). The process may then determine whether the set-and-forget feature has expired or a participant has cancelled the feature (540). For example, implementations may incorporate a network clock (or timer) that provides a standardize time for the participants. The network clock may operate according to a network protocol to synchronize clocks of the user devices with the standardized time. By inspecting the gap time between the current time and the expiration time, the implementations can precisely determine whether time has expired. In other words, the implementations can allow the feature to expire by the expiration time configured by the participant. A participant can also cancel the feature. In the event that the feature has expired (or has been cancelled), the process may stop the set-and-forget operation (550). In the event that the feature has not expired (and has not been cancelled), the process may continue the set-and-forget operation (545).

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. An exchange computer system comprising:
a platform comprising at least one hardware processor configured to
    receive portfolio data encoding, for each of at least two portfolios from at least two computing devices respectively associated with at least two participants, portfolio attributes for each of the at least two portfolios, the portfolio attributes including data indicative of a set and forget expiration time, the data indicative of the set and forget expiration time received through a computer network of the exchange computer system;
    generate, for each of the at least two portfolios, a participant data structure that encodes the portfolio attributes for the respective portfolio and comprises a computer timestamp for automatically executing transactions without user instructions;
    configure, based on the computer timestamp of the participant data structures, the exchange computer system in a set and forget operation mode during which the exchange computer system automatically executes transactions without user instruction; and
    perform a crossing operation between the at least two portfolios for two of the at least two participants, wherein the crossing operation comprises:
        determining whether executing a network of single-leg transactions would exceed a threshold of the portfolio attributes for each of the at least two portfolios; and
        in response to determining that executing the network of single-leg transactions do not exceed the threshold of the portfolio attributes for each of the at least two portfolios, executing the network of single-leg transactions by the exchange computer system in the set and forget operation mode, wherein the execution of the network of single-leg transactions is performed prior to the set and forget expiration time; and
        transmitting data related to the execution of the network of single-leg transactions to the computing devices,
    wherein the platform further comprises a network clock configured to determine that the set and forget expiration time has not expired based on a difference between a first time of the network clock and the set and forget expiration time.

2. The exchange computer system of claim 1, wherein the portfolio data comprises a current measurement of capital efficiency for a portfolio further comprising at least one of: a return on portfolio (ROP), a risk-adjusted return metric, an allocation efficiency metric, a turnover ratio, and a risk metric.

3. The exchange computer system of claim 2, wherein the threshold of the portfolio attributes comprises at least one of: a limit of risk, an asset class limit, a sector/industry limit, a risk limit, a geographic limit, a liquidity limit, a leverage limit, and a compliance limit.

4. The exchange computer system of claim 2, wherein the threshold of the portfolio attributes comprises a daily limit, or a monthly limit, and wherein a single-leg transaction from the network of single-leg transactions involves an exchange between the two participants.

5. The exchange computer system of claim 1, wherein the platform is further configured to forgo execution of the network of single-leg transactions in response to determining that executing the network of single-leg transactions would exceed the threshold of the portfolio attributes.

6. The exchange computer system of claim 1, wherein executing the network of single-leg transactions comprises:
    combining at least a subset of the network of single-leg transactions in a same processing cycle of the exchange computer system; and
    executing the subset of the network of single-leg transactions in the same processing cycle.

7. The exchange computer system of claim 1, wherein performing the crossing operation is conducted without remote monitoring by the two participants of each transaction from the network of single-leg transactions.

8. The exchange computer system of claim 1, wherein the platform is further configured to perform another crossing operation between a participant from the at least two participants and at least one other participant in response to an update of the portfolio data of a participant.

9. The exchange computer system of claim 1, wherein the platform is further configured to perform operations of:
    determining an updated portfolio attribute for each portfolio of the at least two portfolios, wherein the updated portfolio attribute of each portfolio is improved over a respective current value for a portfolio attribute from the portfolio attributes; and
    updating the portfolio data for each of the at least two portfolios so that the respective current value for the portfolio attribute is updated accordingly.

10. The exchange computer system of claim 9, wherein the platform is further configured to perform operations of:
    comparing an updated value for the portfolio attribute for a portfolio from the at least two portfolios with a respective target value for the portfolio attribute for the portfolio; and
    in response to determining that the updated value for the portfolio attribute for the portfolio from the at least two portfolios has not reached the respective target value for the portfolio attribute, performing another crossing operation between the portfolio and another portfolio from the at least two portfolios.

11. A computer-implemented method to provide a crossing facility on an exchange computer system, the computer-implemented method comprising:

receiving portfolio data encoding, for each of at least two portfolios from at least two computing devices respectively associated with at least two participants, portfolio attributes for each of the at least two portfolios, the portfolio attributes including data indicative of a set and forget expiration time during, the data indicative of the set and forget expiration time received through a computer network of the exchange computer system; and performing a crossing operation between the at least two portfolios of two of the at least two participants, wherein the crossing operation comprises:

determining whether executing a network of single-leg transactions would exceed a threshold of the portfolio attributes for each of the at least two portfolios; and in response to determining that executing the network of single-leg transactions do not exceed the threshold of the portfolio attributes for each of the at least two portfolios, executing the network of single-leg transactions by the exchange computer system in the set and forget operation mode, wherein the execution of the network of single-leg transactions is performed prior to the set and forget expiration time, and wherein platform comprises a network clock configured to determine that the set and forget expiration time has not expired based on a difference between a first time of the network clock and the set and forget expiration time; and transmitting, by the exchange computer system, data related to the execution of the network of single-leg transactions to the computing devices.

12. The computer-implemented method of claim 11, wherein the portfolio data comprises a current measurement of capital efficiency for a portfolio further comprising at least one of: a return on portfolio (ROP), a risk-adjusted return metric, an allocation efficiency metric, a turnover ratio, and a risk metric.

13. The computer-implemented method of claim 12, wherein the threshold of the portfolio attributes comprises at least one of: a limit of risk, an asset class limit, a sector/industry limit, a risk limit, a geographic limit, a liquidity limit, a leverage limit, and a compliance limit.

14. The computer-implemented method of claim 12, wherein the threshold of the portfolio attributes comprises a daily limit, or a monthly limit, and wherein a single-leg transaction from the network of single-leg transactions involves an exchange between the two participants.

15. The computer-implemented method of claim 11, further comprising:

in response to determining that executing the network of single-leg transactions would exceed the threshold of the portfolio attributes, forgoing execution of the network of single-leg transactions.

16. The computer-implemented method of claim 11, wherein executing the network of single-leg transactions comprises:

combining at least a subset of the network of single-leg transactions in a same processing cycle of the exchange computer system; and executing the subset of the network of single-leg transaction in the same processing cycle.

17. The computer-implemented method of claim 11, wherein performing the crossing operation is conducted without remote monitoring of each transaction by the two participants.

18. The computer-implemented method of claim 11, further comprising:

in response to an update of the portfolio data of a participant, performing another crossing operation between the participant and at least one other participant.

19. The computer-implemented method of claim 11, further comprising:

determining an updated portfolio attribute for each portfolio of the at least two portfolios, wherein the updated portfolio attribute of each portfolio is improved over a respective current value for a portfolio attribute from the portfolio attributes; and updating the portfolio data for each of the at least two portfolios so that the respective current value for the portfolio attribute is updated accordingly.

20. The computer-implemented method of claim 19, further comprising:

comparing an updated value for the portfolio attribute for a portfolio from the at least two portfolios with a respective target value for the portfolio attribute for the portfolio; and in response to determining that the updated value for the portfolio attribute for the portfolio from the at least two portfolios has not reached the respective target value for the portfolio attribute, performing another crossing operation between the portfolio and another portfolio from the at least two portfolios.

* * * * *